United States Patent Office 2,732,396
Patented Jan. 24, 1956

2,732,396

VITAMIN A INTERMEDIATE

Joseph Donald Surmatis, Pompton Plains, and Benjamin Richard Juliano, Linden, N. J., assignors to Hoffmann-La Roche Inc., Nutley, N. J., a corporation of New Jersey No Drawing. Application March 24, 1953,
Serial No. 344,458

2 Claims. (Cl. 260—461)

This invention relates to a novel cycloaliphatic alcohol and to processes and intermediates useful in preparing the same. More particularly, it relates to the novel chemical compound $\Delta^{2,3}$-cis-3-methyl-5-(2,6,6-trimethylcyclohexen-1-yl)-2,4-pentadien-1-ol and to the novel precursors and processes employed in its preparation. These appear in the following formula scheme, illustrating the synthesis of the above mentioned novel compound, and in which the key compounds of the separate stages may be named as follows:

(I) 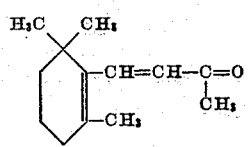

4-(2,6,6-trimethylcyclohexen-1-yl)-3-buten-2-one (β-ionone)

(II) 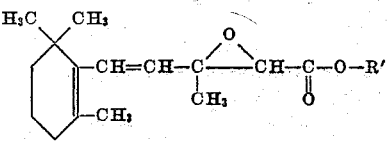

1-ester of 2,3-epoxy-3-methyl-5-(2,6,6-trimethylcyclohexen-1-yl)-4-peten-1-oic acid (III) 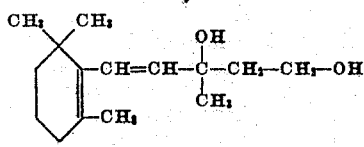

3-methyl-5-(2,6,6-trimethylcyclohexen-1-yl)-4-penten-1,3-diol (IV) 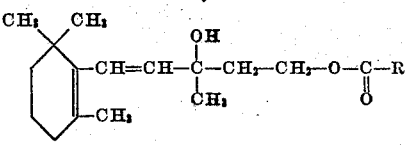

1-acyloxy-3-hydroxy-3-methyl-5-(2,6,6-trimethylcyclohexen-1-yl)-4-pentene (V) 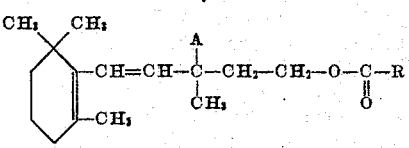

1-acyloxy-3-{dichlorophosphato or chloro or bromo or the like}-3-methyl-5-(2,6,6-trimethylcyclohexen-1-yl)-4-pentene (VI) 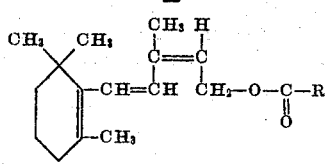

$\Delta^{2,3}$-cis-1-acyloxy-3-methyl-5-(2,6,6-trimethylcyclohexen-1-yl)-2,4-pentadiene (VII) 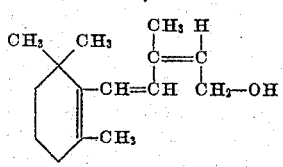

$\Delta^{2,3}$-cis-3-methyl-5-(2,6,6-trimethyl-cyclohexen-1-yl)-2,4-pentadien-1-ol In the above formulas, R' represents a radical (e. g. lower alkyl, such as methyl or ethyl, or monocyclic hydrocarbon aryl, such as phenyl) forming part of the ester group $$-\underset{\underset{O}{\|}}{C}-O-R'$$

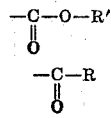

represents a carbonylic acyl radical of an organic carboxylic acid; preferably one in which R represents a monovalent hydrocarbon radical, and still more preferably one in which R represents an alkyl or monocyclic aryl hydrocarbon radical. That is, most preferably —COR represents alkanoyl, such as acetyl or palmitoyl; or monocyclic hydrocarbon aroyl, such as benzoyl or toluoyl;

A represents a monovalent non-hydroxylic halogen-containing acid radical of an inorganic acid, for example, a halo radical or a dihalophosphato radical. Preferably the inorganic acid is selected from the class consisting of hydrochloric acid, hydrobromic acid and dichlorophosphoric acid, so that A preferably represents chloro, bromo or dichlorophosphato.

A general procedure for practicing the invention employs the following steps: The compound (I), β-ionone, is subjected to a Darzens reaction with a haloacetic acid ester to produce the corresponding glycidic ester (II), and the latter is then reduced to the 1,3-diol (III). The 1,3-diol (III) is advantageously converted to the mixed inorganic-organic ester (V) stepwise, first by reacting (III) with an approximately equimolar proportion of an acylating agent appropriate to introduce the desired organic carbonylic acyl radical —COR, such as an acid halide or an acid anhydride, e. g. acetyl chloride or palmitoyl chloride or benzoyl chloride or acetic anhydride; and then reacting the resulting organic ester (IV) with an approximately equimolar proportion of an inorganic acid esterifying agent appropriate to introduce the desired inorganic acid radical —A, for example hydrochloric acid, hydrobromic acid, phosphorus oxychloride or phosphorus oxybromide dichloride. The mixed organic-inorganic ester (V) is then treated to split out its inorganic acid content, i. e. H and A, suitably by heating with an acid acceptor, e. g., a tertiary organic base such as pyridine, dimethylaniline or the like, or an inorganic base such as sodium bicarbonate.

It will be appreciated that the $\Delta^{2,3}$-double bond in the product (VII), i. e. the bond between the second and third carbon atoms, counting from the carbon atom which carries the hydroxyl group, can give rise to geometric isomerism. The same geometric isomerism can, of course, exist in the corresponding esters (VI). The process disclosed above is highly stereospecific, i. e. it produces the $\Delta^{2,3}$-cis isomer in very greatly predominant proportion as compared with $\Delta^{2,3}$-trans isomer. Formulas (VI) and (VII) as written above are intended to emphasize that these products are produced predominantly in "cis" form, i. e. in these compounds the hydrogen attached to the 2-carbon atom and the methyl group attached to the 3-carbon atom can be considered as lying on the same side of a plane passed through the rigid olefinic bond between the 2- and 3-carbon atoms. Essentially then, the invention provides a process for making the $\Delta^{2,3}$-cis isomer of 3-methyl - 5 - (2,6,6 - trimethylcyclohexen-1-yl)-2,4-pentadien-1-ol. The latter compound is useful in the preparation of stereoisomeric forms of vitamin A, specifically those characterized by cis structure about the olefinic bond between the 6- and 7-carbon atoms of the molecule (counting from the terminal carbon atom which carries the hydroxyl group in the vitamin A structure). For example, by oxidizing $\Delta^{2,3}$-cis-3-methyl-5-(2,6,6-trimethylcyclohexen-1-yl)-2,4-pentadien-1-ol with manganese dioxide to produce $\Delta^{2,3}$-cis-3-methyl-5-(2,6,6-trimethylcyclohexen-1-yl)-2,4-pentadien-1-al, condensing the latter with acetone to yield $\Delta^{5,6}$-cis-6-methyl-8-(2,6,6-trimethylcyclohexen-1-yl)-3,5,7-octatrien-2-one, reacting the latter with sodium acetylide and reducing to produce $\Delta^{6,7}$-cis-3-hydroxy-3,7 - dimethyl-9-(2,6,6-trimethylcyclohexen-1-yl)-1,4,6,8-nonatetraene, halogenating the latter with phosphorus tribromide and treating the monobromo product obtained with potassium acetate, there is obtained the acetate of $\Delta^{2,3}$-trans-$\Delta^{6,7}$-cis-3,7-dimethyl - 9 - (2,6,6-trimethylcyclohexen-1-yl)-2,4,6,8-nonatetraen-1-ol. By hydrolysis of this ester, the free alcohol can be obtained. According to another system of nomenclature, this free alcohol can also be designated as $\Delta^3$-cis-vitamin A (the superscript referring to the third double bond counting outwardly from the double bond in the cyclohexene nucleus).

The invention is further disclosed in the following examples, which are illustrative but not limitative thereof.

EXAMPLE 1

*Ethyl 2,3-epoxy-3-methyl-5-(2,6,6-trimethylcyclohexen-1-yl)-4-penten-1-oate*

A mixture of 192 g. of β-ionone, 185 g. of ethyl chloroacetate and 200 cc. of dry toluene was cooled to —20° C. in a 3-necked flask equipped with stirrer, thermometer and a nitrogen inlet tube. Sodium methoxide, 75.5 g., was added portionwise over a period of one-half hour while stirring vigorously. The mixture was then stirred in a nitrogen atmosphere for three additional hours at —20° C. The crude mixture was washed with water, and the toluene and excess ethyl chloroacetate removed at reduced pressure. The product, ethyl 2,3-epoxy-3-methyl - 5 - (2,6,6-trimethylcyclohexen-1-yl)-4-penten-1-oate, distilled at 143°–145° C./0.7 mm.; $n_D^{25}$=1.530.

EXAMPLE 2

*3-methyl-5-(2,6,6-trimethylcyclohexen - 1 - yl)-4-pentene-1,3-diol*

A solution of 195 g. of ethyl 2,3-epoxy-3-methyl-5-(2,6,6-trimethylcyclohexen-1-yl)-4-penten-oate in 700 cc. of ethyl ether was added dropwise at +5° to +10° C. to a vigorously stirred suspension of 23.9 g. of lithium aluminum hydride in 1 liter of ethyl ether. The addition was completed in one hour. The mixture was stirred 3 more hours at +10° to +15° C. The excess of LiAlH₄ was decomposed by the addition of ethyl acetate followed by water. A 10 per cent solution of HCl was added until all of the aluminum hydroxide was dissolved. The ether solution was washed with water, with 5 per cent sodium bicarbonate solution and again with water. Removal of the solvent in vacuo yielded an orange colored, highly viscous oil, 3-methyl-5-(2,6,6-trimethylcyclohexen-1-yl)-4-pentene-1,3-diol, $n_D^{25}$=1.5503.

EXAMPLE 3

*1-acetoxy-3-hydroxy-3-methyl-5-(2,6,6-trimethylcyclohexen-1-yl)-4-pentene*

A mixture of 158 g. of 3-methyl-5-(2,6,6-trimethylcyclohexen-1-yl)-4-pentene-1,3-diol, 158 g. of pyridine and 500 cc. of "Skelly-solve B" (a petroleum naphtha) was cooled to —5° C. in a 2-liter 3-necked flask equipped with thermometer, stirrer and dropping funnel. Acetyl chloride, 58.5 g., was added in 1 hour while maintaining an internal temperature of 0° to —5° C. The mixture was allowed to rise to room temperature while stirring for 3 additional hours. The reaction mixture was washed three times, each time with 500 cc. of water. The solvent was removed in vacuo, yielding 1-acetoxy-3-hydroxy-3-methyl-5-(2,6,6-trimethylcyclohexen-1-yl)-4-pentene, a yellow oil which distilled at 80° C./0.02 mm.; $n_D^{25}$=1.5341–1.5347.

EXAMPLE 4

*1-acetoxy-3-methyl-3-dichlorophosphato-5-(2,6,6-trimethylcyclohexen-1-yl)-4-pentene*

A solution of 186 g. of 1-acetoxy-3-hydroxy-3-methyl-5-(2,6,6-trimethylcyclohexen-1-yl)-4-pentene in 250 cc. of toluene was added over a period of 30 minutes to a stirred mixture of 67 cc. of phosphorus oxychloride, 355 cc. of pyridine and 250 cc. of toluene. During this time the temperature rose to about 60° C. The solution of the product, 1-acetoxy-3-methyl-3-dichlorophosphato-5-(2,6,6-trimethylcyclohexen-1-yl)-4-pentene, was used directly for the procedure of Example 5.

EXAMPLE 5

*$\Delta^{2,3}$-cis-1-acetoxy-3-methyl-5-(2,6,6 - trimethylcyclohexen-1-yl)-2,4-pentadiene*

The reaction flask containing the product of Example 4 was heated on a water bath at 95°–100° C. for two hours. After cooling the reaction mixture to room temperature, excess phosphorus oxychloride was decomposed by cautious addition of cold water. The aqueous layer was extracted with toluene, the combined toluene extracts were washed with water, and the solvent was flashed off at reduced pressure. On fractionation of the residue in vacuo, $\Delta^{2,3}$-cis-1-acetoxy-3-methyl-5-(2,6,6 - trimethylcyclohexen-1-yl)-2,4-pentadiene distilled at 150°–160° C./2 mm.; $n_D^{25}$=1.535.

EXAMPLE 6

*$\Delta^{2,3}$-cis-3-methyl-5-(2,6,6 - trimethylcyclohexen-1-yl)-2,4-pentadien-1-ol*

In a 3-necked flask there was charged 100 g. of $\Delta^{2,3}$-cis-1-acetoxy - 3 - methyl-5-(2,6,6-trimethylcyclohexen-1-yl)-2,4-pentadiene and 400 cc. of ethanol. From a dropping funnel there was added at room temperature a solution of 50 g. of KOH in 200 cc. of water. The mixture was stirred one hour and then diluted with 500 cc. of water. The alcohol was extracted from the mixture with 500 cc. of petroleum ether. After removal of the solvent, the product, $\Delta^{2,3}$-cis-3-methyl-5-(2,6,6 - trimethylcyclohexen-1-yl)2,4-pentadien-1-ol, was distilled at 120°–130° C./0.5 mm.; $n_D^{25}$=1.555. The absorption spectrum showed two maxima between 240 and 270 mμ.

We claim:
1. A compound having the formula

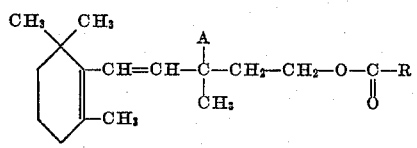

wherein

represents a carbonylic acyl radical of an organic carboxylic acid, and —A represents a monovalent halogen-containing non-hydroxylic inorganic acid radical.

2. 1-acetoxy-3-methyl-3-dichlorophosphato-5-(2,6,6-trimethylcyclohexen-1-yl)-4-pentene.

References Cited in the file of this patent
UNITED STATES PATENTS

| | | |
|---|---|---|
| 2,246,285 | Arundale | June 16, 1941 |
| 2,369,158 | Milas | Feb. 13, 1945 |
| 2,369,165 | Milas | Feb. 13, 1945 |
| 2,369,166 | Milas | Feb. 13, 1945 |
| 2,612,513 | Gluesenkamp et al. | Sept. 30, 1952 |
| 2,652,416 | Coover et al. | Sept. 15, 1953 |